US005529452A

United States Patent [19]

Boyles et al.

[11] Patent Number: 5,529,452

[45] Date of Patent: Jun. 25, 1996

[54] GANTRY CRANE

[75] Inventors: Tonnie M. Boyles, Louisville; Richard W. Patterson, Preston; Thomas E. Coleman, Louisville, all of Miss.

[73] Assignee: The Taylor Group, Inc., Louisville, Miss.

[21] Appl. No.: 288,499

[22] Filed: Aug. 10, 1994

[51] Int. Cl.$^{6}$ .............................. B60P 3/00; B66C 13/54; B66C 9/14; B66C 17/00

[52] U.S. Cl. .......................... 414/460; 212/290; 212/291; 212/312; 212/324; 414/618; 414/592; 180/89.13; 296/190

[58] Field of Search .................................... 414/459–461, 414/592, 607, 618, 668, 663, 671, 664–667, 630–632; 212/165, 171, 206, 213, 218–220; 180/89.3, 99.6; 296/190; 187/249, 348, 357, 359, 361; 294/81.1, 81.2, 81.21

[56] References Cited

U.S. PATENT DOCUMENTS

| | | | |
|---|---|---|---|
| 639,241 | 12/1899 | Ihlenfeldt | 187/361 |
| 3,080,981 | 3/1963 | Kuschel et al. | 212/165 |
| 3,172,500 | 3/1965 | Dolphin et al. | 414/663 |
| 3,396,861 | 8/1968 | Houlton | 414/459 |
| 3,570,695 | 3/1971 | Schwartz | 414/460 |
| 3,957,165 | 5/1976 | Smith . | |
| 4,128,183 | 12/1978 | Finlayson | 414/666 |
| 4,219,094 | 8/1980 | Sturgill | 414/460 |
| 4,378,072 | 3/1983 | Appleman et al. . | |
| 4,667,834 | 5/1987 | Lanigan et al. . | |
| 4,683,969 | 8/1987 | Littau | 212/218 |
| 4,747,745 | 5/1988 | Pippen et al. . | |
| 4,838,438 | 6/1989 | Ishige et al. . | |
| 4,877,365 | 10/1989 | Lanigan, Jr. et al. . | |
| 5,154,568 | 10/1992 | Conner et al. | 414/671 |
| 5,236,294 | 8/1993 | Willis | 180/89.13 |

FOREIGN PATENT DOCUMENTS

| | | | |
|---|---|---|---|
| 1321271 | 4/1963 | France | 414/666 |
| 2007837 | 10/1970 | Germany | 212/165 |
| 648242 | 10/1962 | Italy | 414/666 |
| 6700903 | 7/1968 | Netherlands | 414/460 |
| 153480 | 11/1970 | United Kingdom | 212/206 |

*Primary Examiner*—William E. Terrell
*Assistant Examiner*—R. B. Johnson
*Attorney, Agent, or Firm*—Walker, McKenzie & Walker

[57] ABSTRACT

An improved gantry crane that has a control cab mounted for vertical up and down movement substantially parallel with respect to the upstanding columns of the crane between a lowermost position adjacent the ground and infinite positions within a fixed range. One or both of the sill beams of the crane include a downwardly offset mid-portion extending adjacent to the ground but spaced therefrom with the mid-portion of one of the sill beams being positioned to receive the control cab when in the lowermost position thereof. A supporting beam supports the control cab therebeneath so that the operator in the cab has a 360 degree substantially unobstructed view in all directions.

10 Claims, 4 Drawing Sheets

GANTRY CRANE

BACKGROUND OF THE INVENTION

1. Field of the Invention

The present invention relates, in general, to a gantry crane of the type having rubber tires, commonly used for materials handling, and particularly for handling large, bulky loads such as containerized freight.

2. Information Disclosure Statement

The rubber tire gantry cranes in present use typically are provided with a large framework which includes upstanding columns at the four corners thereof, sill beams disposed on opposite sides of the frame and extending between adjacent pairs of columns, and at least one control cab for controlling the movements of the hoisting mechanism for the grappler mechanisms that engage the load. Also, current gantry cranes have sill beams which are typically straight members and disposed at a level which is above the tires of the crane. Control cabs on current gantry cranes have fixed cabs in two possible locations. The cab may be located below the sill beam near ground level or above the sill beam at some fixed height. The primary disadvantage to a fixed cab is that visibility in certain situations is greatly obstructed. To address this problem, some gantry cranes are manufactured with a low cab under one sill beam and a high cab over the opposite sill beam to allow operators more flexibility during operation. However, the operator is only able to operate from one control cab at a time and must walk to the opposite side of the crane to switch cabs. He must also climb a tall ladder to access the cab. Such dual cabs increase complexity of controls and increase maintenance costs. Additionally, in current gantry cranes, the cabs do not have an unobstructed 360° visual field for the operator.

Having an unobstructed 360° view for the operator in the control cab is important for a number of reasons, including: (1) To give the operator complete all around visibility without any impediments to prevent running over people with the crane, and (2) To permit the operator to look in all directions for maneuvering the crane and the grapplers during the picking up and discharging of the load.

A preliminary patentability search in Class 212, subclasses 218, 219 and 220, and Class 414, subclasses 459 and 460, produced the following patents, some of which may be relevant to the present invention:

Smith, U.S. Pat. No. 3,957,165, issued May 18, 1976; Appleman et al, U.S. Pat. No. 4.,378,072, issued Mar. 29, 1983; Lanigan et al, U.S. Pat. No. 4,667,834, issued May 26, 1987; Pippen et al, U.S. Pat. No. 4,747,745, issued May 31, 1988; Ishige et al, U.S. Pat. No. 4,838,438, issued Jun. 13, 1989; and Lanigan, Jr. et al, U.S. Pat. No. 4,877,365, issued Oct. 31, 1989.

SUMMARY OF THE INVENTION

The present invention is an improved gantry crane that includes a control cab mounted for vertical up and down movement substantially parallel with respect to the upstanding columns of the crane between a lowermost position of the control cab to infinite positions within a fixed range, with full control of the crane being possible from any of these positions, with the control cab being easily accessible from ground level when in the lowermost position, and with the sill beam of the crane including a downwardly-offset mid-portion extending adjacent to the ground but spaced therefrom to provide a space near the ground for the control cab when in said lowermost position of the control cab.

It is an object of the present invention to provide a gantry crane in which a sill beam is constructed in such a manner as to allow vertical movement of a control cab to infinite positions within a fixed range.

A further object is to provide a gantry crane including grappler means for engaging a load to be supported; supporting means for supporting the grappler means, the supporting means including at least an upstanding pair of spaced columns and including at least one sill beam, the sill beam including a downwardly offset mid-portion extending adjacent to the ground but spaced therefrom; control cab means for controlling the grappler means; and hoisting means, operably coupled to the control cab means and the pair of columns, for selectively moving the control cab means up and down substantially parallel with respect to the pair of columns between a lowermost position adjacent the mid-portion of the sill beam and other positions spaced upwardly therefrom.

A further object is to provide a gantry crane in which the operator has substantially a 360 degree view all around the control cab and in which the operator can move the control cab to strategic locations both high and low relative to the loads for better control in the maneuvering of the crane and of the load.

DESCRIPTION OF THE PREFERRED EMBODIMENT

Figure 1:
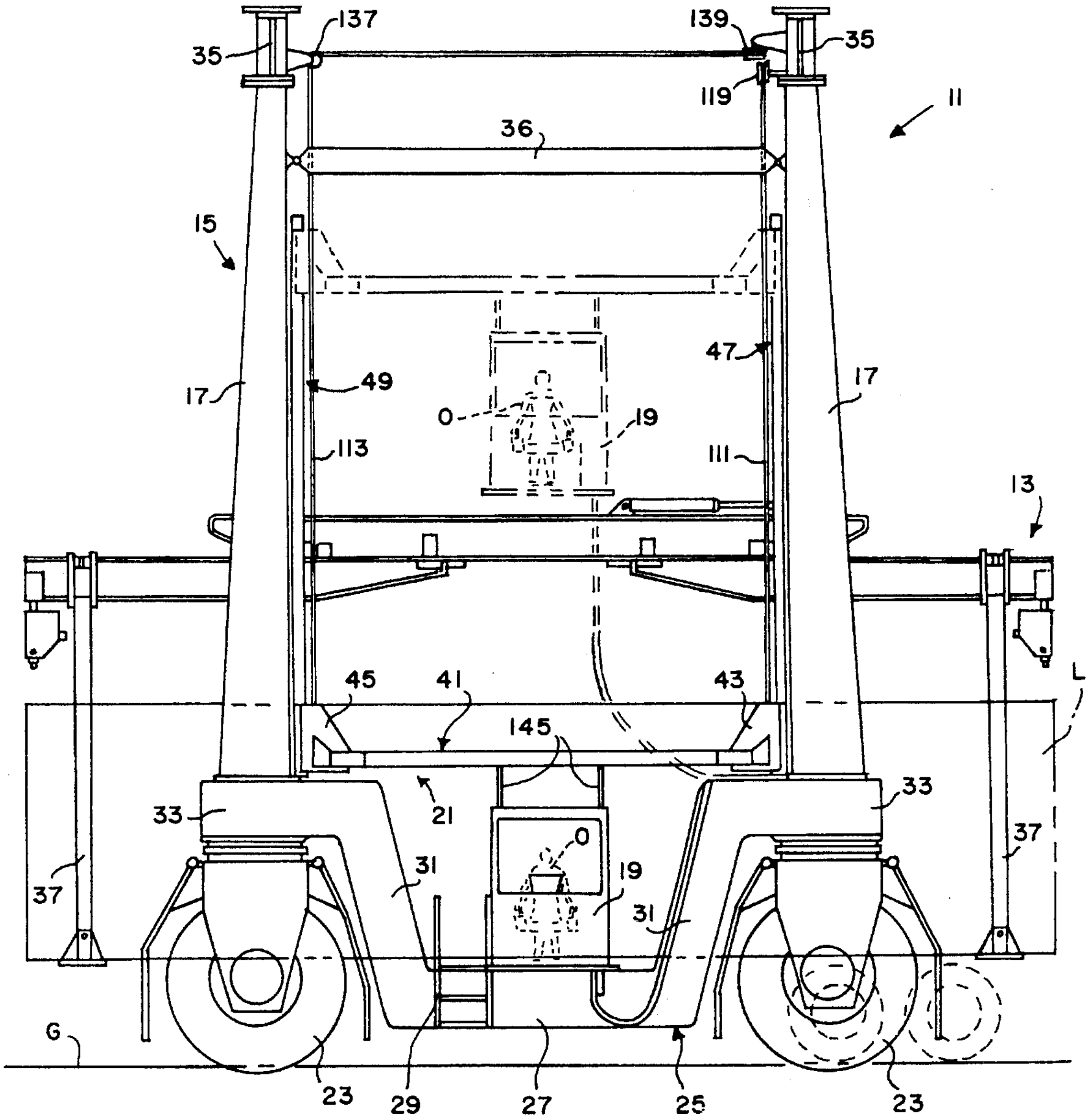
FIG. 1 is a side elevational view of the gantry crane of the present invention with parts removed for purposes of illustration.

Referring now to the drawings, it will be seen that the improved gantry crane 11 of the present invention includes, in general, grappler means 13 for engaging a load, such as load L, to be supported and maneuvered; supporting means 15 for supporting grappler means 13, which supporting means 15 preferably includes four columns 17 (only three of which are shown in the drawings) spaced apart and upstanding at the four corners of the crane in the usual manner; control cab means 19 for controlling grappler means 13, and hoisting means 21 operably coupled to control cab means 19 and to a pair of columns 17 for selectively moving control cab means 19 vertically up and down substantially parallel with respect to said pair of columns. At the lower ends of columns 17 are wheels 23 having rubber tires for rollingly supporting crane 11 for movement over the ground G and for steering the crane.

One of the unique features of the present invention is the shape of the lower sill beam 25 which is somewhat U-shaped, that is, sill beam 25 includes a downwardly offset depressed or midportion 27 extending adjacent ground G in parallel spaced relationship to the ground so that the operator O in control cab means 19 can exit and enter the cab means from the ground G and, if desired, a small step ladder 29 may be provided. Sill beam 25 also includes intermediate portions 31 which are preferably respectively integrally attached to midportion 27 at the opposite ends of the midportion and extend upwardly and outwardly away from one another to the respective upper ends thereof where they are respectively attached to end portions 33 of the sill beam 25, with the end portions being disposed between their associated columns 17 and wheels 23. In contrast to the above-described construction of the sill beam 25 of the present invention, heretofore lower sill beams of typical gantry cranes have been horizontally straight across between a pair of columns at a level above the wheels of the crane. The importance of the U-shaped sill beam of the present invention in which the midportion of the sill beam dips downwardly between the wheels 23 can be seen and appreciated more from the description to follow later in the specification.

In addition, crane 11 includes suitable framework that preferably includes not only the four columns 17 but also a pair of top beams 35 that respectively extend across the front and back of crane 11 between the upper ends of opposing pairs of columns 17. Also, crane 11 includes a pair of members 36 (only one of which is shown in the drawings) which respectively extend across the opposite sides of crane 11 between opposing pairs of columns 17 adjacent the upper ends of the columns.

Additionally, grappler means 13 preferably includes a plurality of grapplers 37, a pair of which are located adjacent the front of crane 11 for lifting one end of the load L and another pair of which are located adjacent the rear of the crane for lifting the opposite end of the load. Also, grappler means 13 includes suitable mounting means, such as a pair of trolley beams 39 and other suitable structure, for maneuvering the grapplers in a desired manner well known to those skilled in the art including a suitable hydraulic system which includes, for example, among other things, hydraulic cylinder means 40, for actuating the mounting means and grapplers as well as controls therefor located in control cab means 19, which are preferably of any suitable construction well known to those skilled in the art.

Hoisting means 21 includes a horizontally extending support beam 41, first carriage means 43 and second carriage means 45 respectively fixedly mounted on opposite ends of support beam 41. Also, hoisting means 21 includes a pair of guide means, 47, 49 respectively vertically mounted on an adjacent pair of columns 17 at one side of the crane 11. First carriage means 43 and second carriage means 45 respectively movably engage guide means 47, 49 for guiding carriage means 43, 45 and support beam 41 in up and down movements thereof. Support beam 41 preferably includes a pair of support members 51 disposed in parallel spaced relationship respectively on opposite sides of said first and second carriage means 43, 45. Each of support members 51 include an outer member 53 and an inner member 55 telescopically and slidably joined together. Inner members 55 are fixedly joined together by suitable means, as by cross members 56. Also, each of support members 51 includes a pin 57 attached to its inner member 55 extending upwardly through a slot 59 in outer member 53 for allowing limited movement of the members 53, 55 relative to one another. Thus, if there is any deflection in the columns 17 or flexing of the frame of crane 11, the slot 59 will accommodate such movements. At the opposite end of support beam 41 there is no slot and pin as above described but instead the second carriage means 45 is fixedly joined to inner member 55.

First and second carriages means 43, 45 are substantially alike and the following additional description of carriage means 43 will suffice for both. Carriage means 43 includes a pair of vertical side plate members 61, 62 which are respectively fixedly joined to support members 51 as by welding or the like. Suitable members such as braces 63, 64 rigidly join the side plate members 61, 62 together, and there is preferably a suitable cover plate 65 provided. There are preferably eight rollers, hereinafter described, for keeping the carriage in proper alignment against tilting or rocking. There are two rollers 67, 69 rotatably mounted respectively from side plates 61, 62 adjacent the top portion of the side plates for rotation about horizontal axes. Two other rollers 71, 73 are rotatably mounted respectively from side plates 61, 62 adjacent the bottom portion of the side plates for rotation about horizontal axes which are respectively directly below rollers 67, 69. Another pair of rollers 75, 77 are respectively mounted from side plates 61, 62 near the bottom portion of the side plates but for rotation about horizontal axes at a higher level than rollers 71, 73. The axes of rollers 67, 69, 71, 73, 75, and 77 are all parallel to one another and extend in a direction transversely with respect to the carriage means 43. Still another pair of rollers 79, 81 are rotatably mounted respectively by suitable means, such as member 82, from carriage means 43 for rotation about horizontal axes with the axes being perpendicular to the axes of rollers 67, 69, 71, 73, 75, and 77. Rollers 79, 81 are respectively disposed adjacent the top and bottom portions of carriage 43 with roller 81 being directly below roller 79.

Guide means 47 and guide means 49 are substantially similar to one another and the following description of guide means 47 and its association with carriage means 43 will suffice for both. Guide means 47 includes a vertically disposed guide bar 83 which has teeth 85 provided along one edge thereof for a purpose later to be described. Guide bar 83 is fixedly attached to column 17 as by welding or the like. On opposite sides of guide bar 83 are respectively provided angle members 87, 89 with spacers 91, 93 respectively being disposed between the angle members and guide bar 83. The angle members 87, 89 are fixedly mounted on guide bar 83 by suitable means as a plurality of bolt and nut means 95 spaced along the length of the guide bar 83 and extending respectively through aligned apertures in the guide bar, the spacers and the angle members. The rollers 67 and 71 engage one side of the outwardly-extending flange of angle member 87, and roller 75 engages the opposite side of the outwardly extending flange of angle member 87; the rollers 69, 73 engage one side of the outwardly extending flange of angle member 89, and roller 77 engages the opposite side of the outwardly extending flange of angle member 89 for preventing the support beam 41 from tilting in a vertical plane extending longitudinally through the center of the support beam. To prevent the support beam 41 from rocking in a plane perpendicular to the above-mentioned plane, rollers 79, 81 engage the inner flanges of angle members 87, 89.

Figure 6:
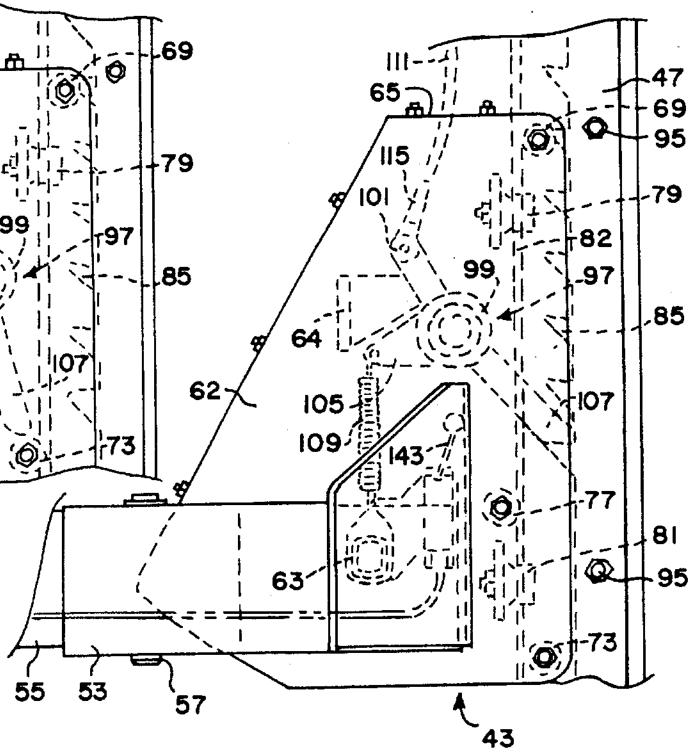
FIG. 6 is a side elevational view of that shown in FIG. 5 and with the carriage shown in a locked position.

Carriage means 43 also includes a bell crank 97 rotatably mounted by suitable means, well known to those skilled in the art, to side plates 61, 62. Bell crank 97 includes a hub portion 99; a central lever 101, a pair of levers 103, 105, and a pawl 107 respectively fixedly attached to hub portion 99. A pair of tension springs 109 are respectively disposed between levers 103, 105 and a fixed portion of carriage means 43 such as a brace 63 so that bell crank 97 is urged in a counterclockwise direction as viewed in FIG. 6 to urge pawl 107 into engagement with teeth 85.

Hoisting means 21 additionally includes a pair of cables, i.e., a first cable 111, and a second cable 113. First cable 111 has a first end 115 fixedly attached by suitable ,well known means to lever 101 of first carriage means 43 and extends vertically upwardly and then over a sheave 119 which guides first cable 111 in a substantially horizontal direction to a place where the second end 117 is fixedly attached by suitable means to the distal end of the piston end 121 of hydraulic cylinder means 123, which cylinder means 123 is fixedly attached at its base end 125 to top beam 35 by suitable well known means. Cylinder means 123 is disposed in a position that is parallel to top beam 35. Also, cylinder means 123 is of a suitable known type that is preferably provided with an inlet port 127 for the delivery of hydraulic fluid under pressure from a suitable source 129 through hydraulic line 131 in which is interposed a valve 133 located in control cab means 19 so that when the valve is moved to a first or open position cylinder means 123 is retracted and the hydraulic fluid at the base end 125 of the cylinder means is discharged through outlet port 135 and back to source 129.

The first end of second cable 113 is attached to second carriage means 45 in a manner similar to that heretofore described relative to the attachment of first carriage means 43 and first cable 111. From its attachment to second carriage means 45, second cable 113 extends upwardly to a sheave 137 where the second cable is directed horizontally by the sheave 137 to another sheave 139 which rotates about a vertical axis and directs the second cable at a ninety degree angle towards the second end 141 of second cable 113 where the second end is attached by suitable means to the piston end 121 of cylinder means 123.

During the normal operation of hoisting means 21, when the operator O desires to raise control cab means 19, he moves valve 133 (which primarily is located in the control cab means, although additional controls may be provided at other locations, if desired) to an open or actuated position that retracts cylinder means 123. This action pulls cables 111, 113 upwardly, which rotates the bell crank 97 of carriage means 43 clockwise as viewed in FIG. 6, to disengage pawl 107 from teeth 85 and, at the same time, the pawl of carriage 45 is disengaged from its associated teeth to allow free movement of carriages 43, 45, so that support beam 41 and control cab 19 can be positioned at a height desired. To lower the control cab 19, valve 133 is moved to relieve the pressure at port 127 and at the same time to permit the hydraulic fluid to flow into cylinder means 123 through port 135 in a manner well known to those skilled in the art. Then, in the event that an abnormal situation occurs and either one or both of cables 111 or 113 become slack, as, for example, when a cable or cables accidentally break, the tension springs 109 will cause the bell crank(s) at the associated broken cable(s) to rotate counterclockwise as viewed in FIG. 6 and engage the pawl(s) with its associated teeth means and lock the carriage(s) against downward movement. Also, movement of the pawl(s) into the above mentioned engaged position(s) will cause actuation of limit switch(es) 143. There is preferably provided a limit switch 143 for each carriage means 43, 45. The limit switch(es) 143 are preferably of well known construction and are incorporated in a well known manner into the known circuit system of the crane, and would do two things: (1) disrupt the power to the lift if either one or both of the carriages means 43, 45 became locked, and (2) provide means for monitoring the hoisting means to determine if and when it is actually working. In addition, if desired, other safety features may be provided such as well known features found in elevators and cranes, as, for example, two-handed latches well known to those skilled in the art on the opening mechanism for the doors to the control cab.

Figure 2:
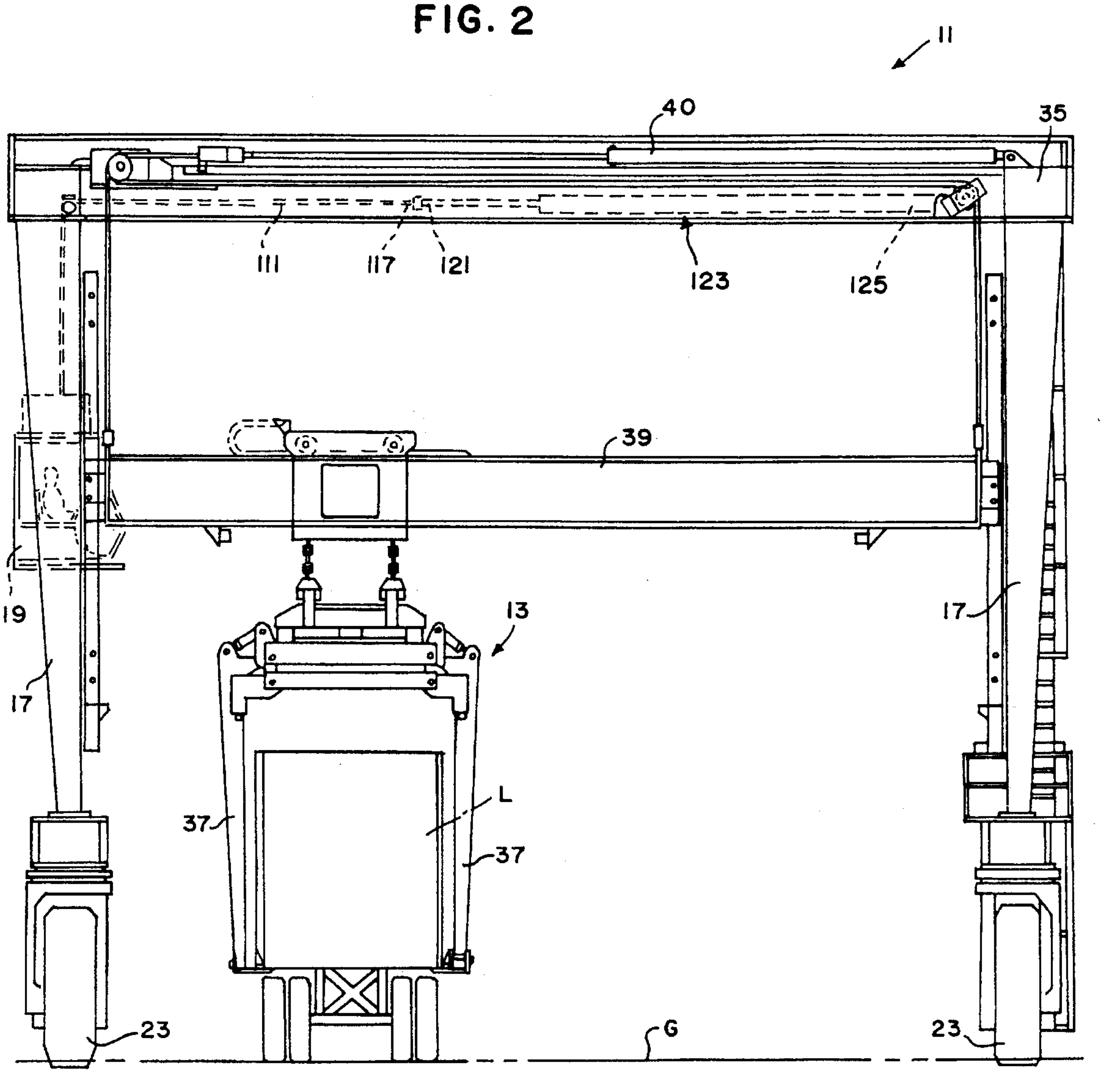
FIG. 2 is a front elevational view of the gantry crane of the present invention, with parts removed for purposes of illustration.
Figure 3:
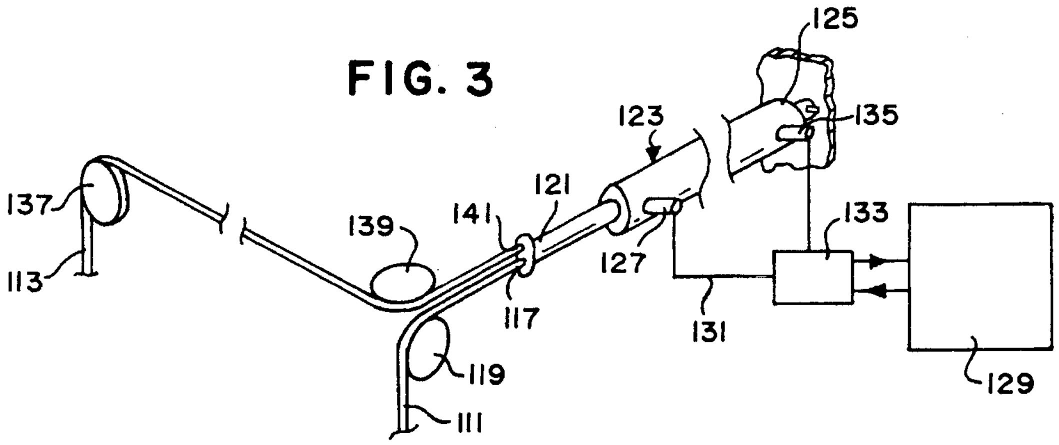
FIG. 3 is a schematic view showing a portion of the hoisting means of the present invention.
Figure 4:
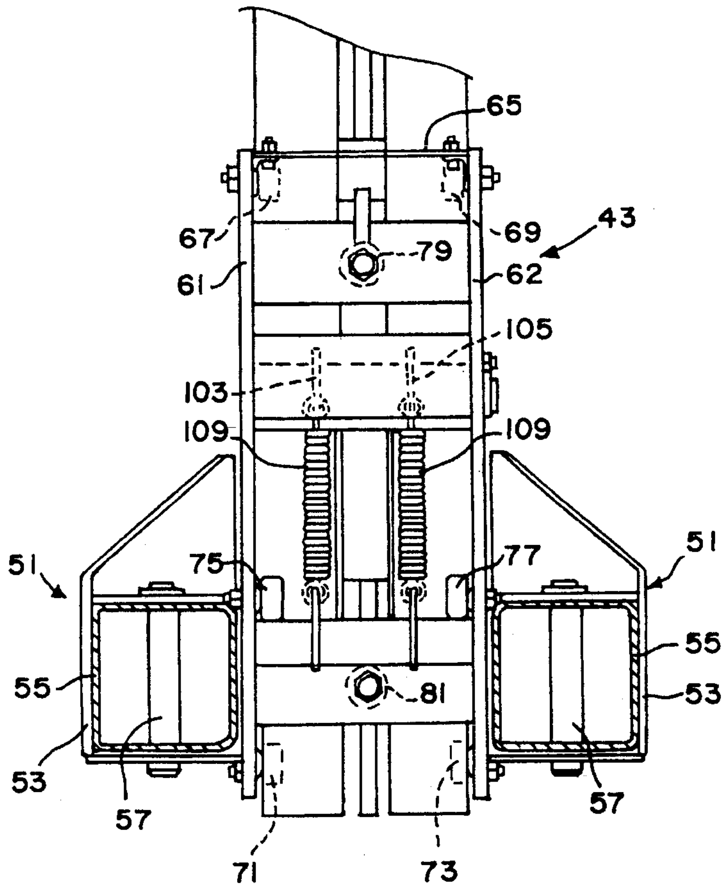
FIG. 4. is a sectional view taken as on the line 4—4 of FIG. 5.
Figure 5:
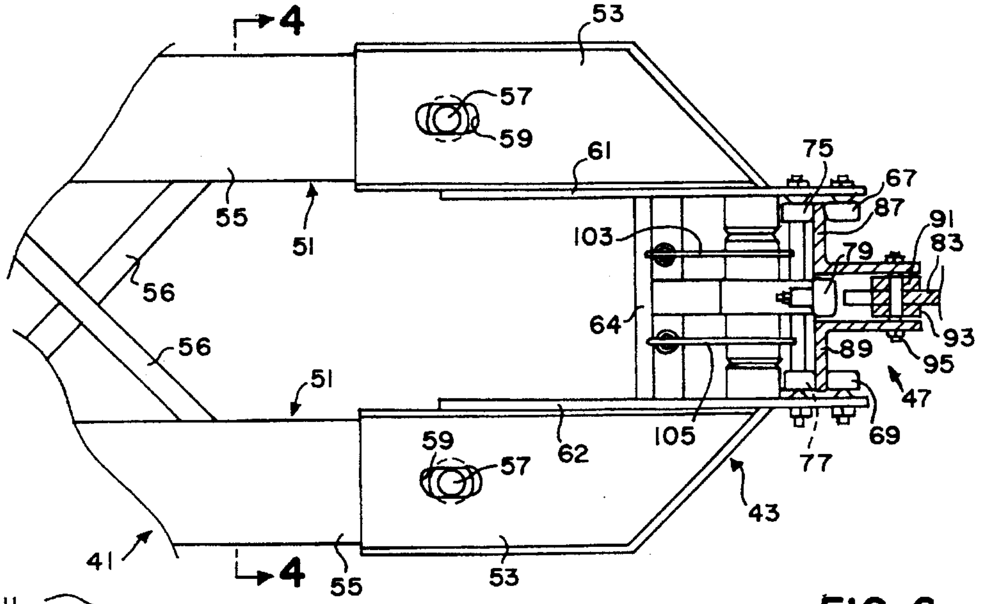
FIG. 5. is a fragmentary top view of a portion of the support beam of the control cab and a portion of the carriage at one end of the support beam with its associated guide means.
Figure 7:
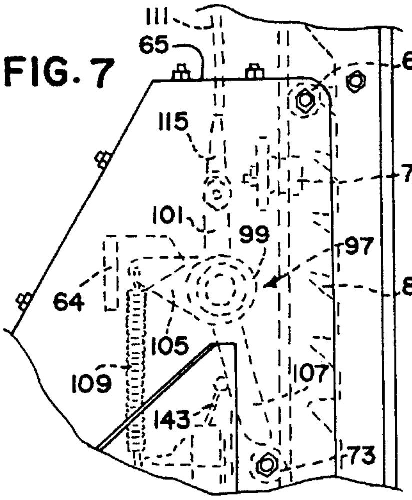
FIG. 7 is a fragmentary portion of that shown in FIG. 6, but with the carriage shown in an unlocked position.

Control cab means 19 is fixedly attached to support beam 41 and mounted therebeneath by suitable means such as brackets 145 so that the control cab means hangs downwardly from the support beam and is spaced substantially halfway between two of the columns 17 on one side of crane 11. In its lowermost position, shown in solid lines in FIG. 1, control cab means 19 rests on midportion 27 of sill beam 25 between the two wheels 23 on said one side of crane 11. The broken line positions in FIGS. 1 and 2 of support beam 41 and cab means 19 illustrates upper positions thereof. Upper positions of control cab means 19 allow visibility by the operator, as for example, when there is a double stack of containers to be maneuvered into position such upper positions allow good visibility.

If desired, the opposite side of crane 11 from control cab means 19 may be provided with a sill beam shaped like that of sill beam 25 and with the engine of the crane being positioned in the downwardly offset portion thereof for easy access to the engine for maintenance and the like.

From the foregoing it will be understood that the present invention provides a crane in which the control cab allows 360 degree viewing by the operator and is strategically located and arranged for movement selectively up and down to infinite positions within a fixed range from raised positions for taller loads to a lowermost position adjacent the ground from where the operator can view the bottom portions of the load and the adjacent areas for ease in maneuvering the load and for watching to prevent injury to persons in the area.

Although the present invention has been described and illustrated with respect to a preferred embodiment and a preferred use therefor, it is not to be so limited since modifications and changes can be made therein which are within the full intended scope of the invention.

We claim:

1. A gantry crane including crane support means for supporting the crane for movement over the ground comprising:

(a) grappler means for engaging and supporting a load;

(b) supporting means for supporting said grappler means, said supporting means including at least a plurality of pairs of upstanding spaced columns respectively fixed in height relative to said crane support means;

(c) a vertically movable control cab with means for controlling said grappler means; means on said columns for guiding said control cab for vertical movement thereon;

(d) first hoisting means, operably coupled to said control cab and to at least to one of said pairs of columns, for selectively moving said control cab vertically up and down substantially parallel with respect to said columns and to both higher and lower positions relative to a load supported by said grappler means and to a plurality of positions within a fixed range from said higher positions to a lowermost position adjacent the ground from where an operator in said control cab can view the bottom portions of the supported load, said hoisting means including a vertically movable support beam having opposite ends, and said control cab being attached to said support beam, said higher positions including at least one position in which said control cab is higher than the supported load; and (e) second hoist means for vertically moving said grappler means independently of said control cab.

2. A gantry crane comprising:

(a) vertically movable grappler means for engaging and supporting a load;

(b) a framework including vertically movable supporting means for supporting said grappler means, said supporting means including a plurality of pairs of upstanding spaced columns, means for connecting said columns in fixed position relative to each other, wheel means respectively disposed below the lower end of each of said spaced columns for rollingly supporting said crane for movement over the ground, and including at least one sill beam located below said columns, said sill beam including a downwardly offset depressed portion extending to a position adjacent to the ground but spaced therefrom and disposed between a pair of said wheel means at a height in which the top of said depressed portion is below a rod portion of said wheel means;

(c) first hoist means for vertically moving said grappler means;

(d) vertically movable control cab means for controlling said grappler means;

(e) means mounting said control cab means between a pair of said columns for vertical guided movement; and (f) second hoisting means operably coupled to said control cab means and to said framework for selectively moving said control cab means up and down substantially parallel with respect to said columns independently of said grappler means to both higher and lower positions relative to a load supported by said grappler means and to a plurality of positions within a fixed range from said higher positions to a lowermost position adjacent the ground and adjacent said depressed portion from where an operator positioned in said control cab means can view the bottom portions of a load supported by said grappler means, said higher positions including at least one position in which said control cab is higher than the supported load.

3. The gantry crane of claim 2 in which said hoisting means includes:

(a) a movable support beam having opposite ends;

(b) a first carriage means and a second carriage means respectively mounted on opposite ends of said support beam;

(c) a pair of guide means, respectively mounted on said pair of spaced columns and respectively engaging said first and second carriage means, for guiding said first and second carriage means and said support beam during the movements thereof.

4. The gantry crane of claim 3 in which said support beam includes a pair of support members disposed in parallel spaced relationship respectively on opposite sides of said first and second carriage means, each of said support members including an outer member and an inner member telescopically and slidably joined together, each of said support members additionally including pin and slot means for allowing limited movement of said outer and inner support members relative to one another.

5. The gantry crane of claim 3 in which said hoisting means includes means for mounting said control cab means beneath said support beam to prevent visual obstruction by said support means to a person in said control cab means looking outwardly in any 360 degree horizontal direction.

6. A gantry crane comprising:

(a) grappler means for engaging a load to be supported;

(b) supporting means for supporting said grappler means, said supporting means including at least an upstanding pair of spaced columns and including at least one sill beam, said sill beam including a downwardly offset midportion extending adjacent to the ground but spaced therefrom, said supporting means including at least one top beam;

(c) control cab means for controlling said grappler means; and (d) hoisting means, operably coupled to said control cab means and said columns, for selectively moving said control cab means up and down substantially parallel with respect to said pair of columns between a lowermost position adjacent said midportion and other positions spaced upwardly therefrom, said hoisting means including:

i. a support beam having opposite ends:

ii. first carriage means and a second carriage means respectively mounted on opposite ends of said support beam;

iii. a pair of guide means, respectively mounted on said pair of spaced columns and respectively engaging said first and second carriage means, for guiding said first and second carriage means and said support beam during the movements thereof;

iv. a pair of cables each having first and second ends;

v. sheave means for guiding said cables;

vi. first and second attachment means for attaching said first ends of said cables respectively to said first and second carriage means;

vii. a single hydraulic cylinder means mounted parallel to said top beam and attached at one end to said top beam and attached at the opposite end to said second ends of said cables for selectively raising and lowering said cab means; and viii. means for mounting said control cab means beneath said support beam to prevent visual obstruction by said support means to a person in said control cab means looking outwardly in any 360 degree horizontal direction.

7. The gantry crane of claim 6 in which is included a first bar means and a second bar means respectively mounted on said pair of spaced columns, each of said bar means including teeth means; in which said first attachment means comprises a first bell crank including a first arm and a second arm in the form of a first pawl means for engagement with the teeth means of said first bar means when a first condition exists that the cable attached to said first carriage means becomes slack; and in which said second attachment means comprises a second bell crank including a first arm and a second arm in the form of a first pawl means for engagement with the teeth means of said second bar means when a second condition exists that the cable attached to said second carriage means becomes slack.

8. A gantry crane comprising:

(a) grappler means for engaging a load to be supported;

(b) supporting means for supporting said grappler means, said supporting means including:

i. at least four upstanding spaced columns;

ii. at least one sill beam, said sill beam including a downwardly offset midportion extending adjacent to the ground but spaced therefrom; and iii. a pair of parallel top beams extending respectively between pairs of said columns;

(c) control cab means for controlling said grappler means;

(d) hoisting means, operably coupled to said control cab means and an adjacent pair of said upstanding columns, for selectively moving said control cab means between said adjacent pairs of said columns and up and down substantially parallel with respect to said adjacent pair of said columns between a lowermost position adjacent said midportion and other positions spaced upwardly therefrom; said hoisting means including:

i. a support beam having opposite ends, said support beam including a first support member and a second support member, said first and second support members being telescopically and slidably joined together, and said support beam additionally including pin and slot means for limiting movement of said first and second support members relative to one another;

ii. a first carriage means and a second carriage means respectively mounted on opposite ends of said support beam;

iii. a pair of cables each having first and second ends;

iv. sheave means for guiding said cables;

v. first and second attachment means for attaching said first ends of said cables respectively to said first and second carriage means;

vi. a single hydraulic cylinder means, mounted on one of said top beams and attached at one end to said one of said top beams and attached at the opposite to said second ends of said cables, for selectively raising and lowering said cab means;

vii. means for mounting said control cab means beneath said support beam to prevent visual obstruction by said support means to a person in said control cab means looking outwardly in any 360 degree horizontal direction; and (e) a pair of guide means, respectively mounted on said adjacent pair of spaced columns and respectively engaging said first and second carriage means, for guiding said first and second carriage means and said support beam during the movements thereof.

9. The gantry crane of claim 8 in which is included a first bar means and a second bar means respectively mounted on said adjacent pair of spaced columns, each of said bar means including teeth means; in which said first attachment means comprises a first bell crank including a lever to which the first end of one of said cables is attached and a pawl means for engagement with the teeth means of said first bar means when a first condition exists that the cable attached to said first carriage means becomes slack; and in which said second attachment means comprises a second bell crank including a lever to which the first end of the other of said cables is attached and pawl means for engagement with the teeth means of said second bar means when a second condition exists that the cable attached to said second carriage means becomes slack.

10. The gantry crane of claim 5 wherein when said control cab is in said lowermost position said control cab rests on said depressed portion.

* * * * *

UNITED STATES PATENT AND TRADEMARK OFFICE
CERTIFICATE OF CORRECTION

PATENT NO. : 5,529,452

DATED : June 25, 1996

INVENTOR(S) : Tonnie M. Boyles, Richard W. Patterson and Thomas E. Coleman

It is certified that error appears in the above-identified patent and that said Letters Patent is hereby corrected as shown below:

Column 7, line 22 (Claim 2, line 17): "below a rod portion" should be --below a top portion--.

Signed and Sealed this

Second Day of December,1997

Attest:

Bruce Lehman

BRUCE LEHMAN

*Attesting Officer*

*Commissioner of Patents and Trademarks*